UNITED STATES PATENT OFFICE.

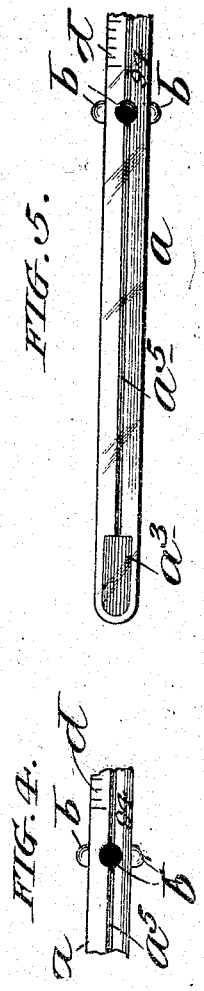
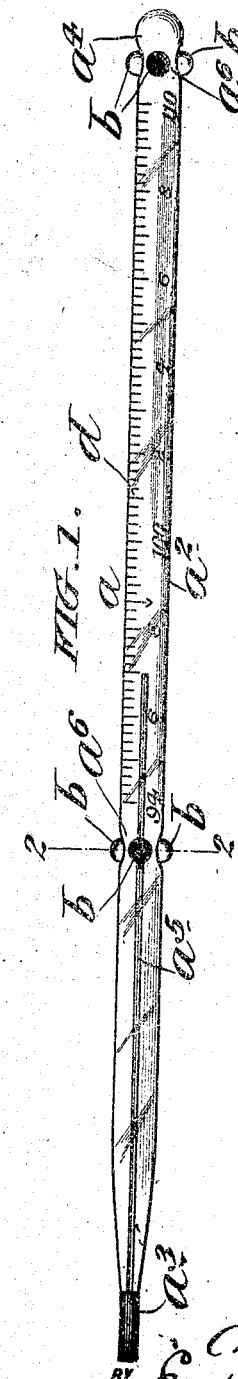
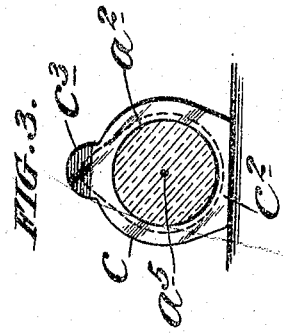
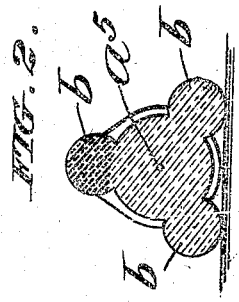

CHARLES NURNBERG, OF NEW YORK, N. Y.

CLINICAL AND OTHER THERMOMETER.

No. 900,580.	Specification of Letters Patent.	Patented Oct. 6, 1908.

Application filed August 8, 1907. Serial No. 387,618.

*To all whom it may concern:*

Be it known that I, CHARLES NURNBERG, a citizen of the United States, and residing at New York, in the county of New York and State of New York, have invented certain new and useful Improvements in Clinical and other Thermometers, of which the following is a specification, such as will enable those skilled in the art to which it appertains to make and use the same.

This invention relates to clinical thermometers such as are usually employed by physicians for determining the temperature of the body, and to test thermometers used by chemists for determining the temperature of liquids; and the object thereof is to provide a thermometer of this class with antirolling devices, whereby the thermometer when placed on a table, desk or other support will not roll or turn over but will always be held in a position for use, or in a position in which the scale thereon can be read; a further object being to provide a thermometer of the class specified with antirolling devices which will support the body portion of the thermometer above a table, desk or other support, when said thermometer is placed thereon and prevent the said body portion of the thermometer and especially the bulb or mercury end thereof from coming in contact with said table, desk or other support; a further object being to provide a clinical thermometer of the class employed by physicians for determining the temperature of the body with means for limiting the extent to which the bulb end of the thermometer may be inserted into the mouth or other organs of the body, and antirolling devices placed adjacent to each end of the body portion which protect and locate the scale, or between which the scale is placed, and which also aid in the reading of the scale, or indicate the position in which the thermometer should be held in order to read the scale; a further object being to provide a thermometer of the class specified with devices, which in addition to serving for the purpose or purposes set out also serve to prevent the thermometer from slipping out of the hand in the operation of shaking down the mercury; and with these and other objects in view the invention consists in a thermometer of the class specified constructed as hereinafter described and claimed.
The invention is fully disclosed in the following specification, of which the accompanying drawing forms a part, in which the separate parts of my improvement are designated by suitable reference characters in each of the views, and in which:—

Figure 1 is a plan view of a clinical thermometer made according to my invention; Fig. 2 a cross section on the line 2—2 of Fig. 1; Fig. 3 a view similar to Fig. 2 but showing a modification; Fig. 4 a partial view similar to Fig. 1 but showing a modification; and, Fig. 5 a view similar to Fig. 1, but showing the mercury end of an ordinary test thermometer such as is employed by chemists for determining the temperature of liquids.

In the practice of my invention as shown in Figs. 1 to 4 inclusive, I provide an ordinary clinical thermometer $a$, comprising a body portion $a^2$ and a reduced end portion $a^3$ in which the mercury is placed. At a predetermined distance from the end $a^3$ of the thermometer, the body portion $a^2$ thereof, is provided with a plurality of knobs or projections $b$ three of which are shown, and adjacent to the end $a^4$ of the body portion of the thermometer opposite the end $a^3$ are a similar number of knobs or projections $b$. In both positions two of the knobs or projections $b$ are on the opposite sides of the thermometer or the body portion thereof, and extend outwardly below the same beyond any part of the bulb or main body portion so as to form supports for the thermometer and hold the same above and out of contact with a table or other support when placed upon the same and also prevent it from rolling or turning, while the other knobs or projections $b$ are at the top of the body portion of the thermometer and are colored black, blue or some other color, the object of the colored knobs or projections $b$ at the top of the body portion of the thermometer being to aid the eye in reading the thermometer and also to aid the eye in locating or seeing the mercury in the tubular bore $a^5$ and thus aid in reading the scale. These colored knobs extend outwardly as far as the uncolored and will serve the purpose of supporting and holding the thermometer should it be so placed that they will engage the support on which the device may rest.

In the form of construction shown in Figs. 1 and 2 there are annular grooves $a^6$ in the body portion of the thermometer at the points where the knobs or projections $b$ are placed, but this form of construction is not absolutely essential, and in Fig. 4 I have shown a modification in which the walls of the body portion of the thermometer are straight at these points and the knobs or projections $b$ are formed thereon.

In Fig. 3, I have shown a modification in which a band or annular enlargement $c$ is substituted for the knobs $b$, and this band is provided at the bottom thereof with a flat portion $c^2$ and at the top thereof with a colored knob or projection $c^3$, and the band $c$ when formed as described will also prevent the thermometer from rolling or turning when placed on a table or support, and the colored knobs $c^3$ perform the same function as the colored knobs $b$ in the construction shown in Figs. 1 and 4.

In Fig. 5, I have shown another modification in which the end $a^3$ of the thermometer is of the same dimensions as the body portion and other end thereof, and this form of thermometer is particularly designed for use by chemists and others in testing the temperature of liquids.

It will be observed that in both forms of construction, the scale $d$ begins at the right of the knobs or projections $b$ adjacent to the end $a^3$, and that portion of the thermometer between said knobs or projections and said end has no scale.

In thermometers of this class as usually made, the scale is so located that a portion thereof is inserted into the mouth or other organs of the body when making a test of the bodily temperature, and by reason of this fact that portion of the scale which is inserted into the mouth is worn off, and, in addition to this, the coloring material of the scale gets into the mouth or other organs of the body and this is one objection which my improvement obviates.

It will also be understood that the knobs or projections $b$, or the annular band $c$ when substituted for said knobs or projections adjacent to the end $a^3$ of the thermometer, also limit the extent to which the thermometer is passed into the mouth or other organs of the body in making a test of the bodily temperature, and this is another advantage with my improved construction.

My invention is not limited to the use of the knobs or projections $b$, or to the annular bands $c$, as a substitute for said knobs or projections, and any device or devices placed at the points where the knobs or projections $b$ are located, and which will prevent the thermometer from turning or rolling when placed upon a table or other support, and which will also serve to limit the extent to which the end $a^3$ of the thermometer may be inserted into the mouth or other organs of the body may be substituted for the knobs or projections $b$ or annular bands $c$.

With my improvement the thermometer does not need any disinfectant on the engraved parts and the scale is thus protected. The knobs or projections $b$ or the annular band $c$ when employed, said devices constituting the anti-rolling devices, also support the body of the thermometer above a table, desk or similar article and enable it to be picked up more conveniently, and said devices also enable the operator to hold the thermometer more securely, while shaking it down without touching the bulb or mercury end thereof.

It will be seen that by having the knobs or projections near the bulb end of the main body alone and having them extend outwardly beyond the main body, the bulb end and all but the extreme opposite end of the main body will be held above and out of contact with a table or other support upon which it may be laid, and that by having such knobs or supports at two separated points upon the main body the instrument can be easily laid upon a table or other support without bringing the bulb or any part of the body portion in contact with said table or support and that it will be held in this position with all parts except the knobs out of contact with the table or support. This feature of applicant's construction prevents the bulb or body portion from gathering dust or germs and prevents the rapid cooling of the bulb and main body.

Having fully described my invention, what I claim as new and desire to secure by Letters Patent, is:—

1. A clinical thermometer having the main body within a short distance of the mercury bulb provided with knobs or projections extending outwardly beyond the line of the main body, whereby the bulb, when the instrument is placed on a table or other support, will be held above and out of contact with said support and the thermometer be prevented from rolling or turning, substantially as described.

2. A clinical thermometer, having the main body of the same at two longitudinally separated points provided with knobs or projections extending outwardly beyond any part of the main body portion, whereby the bulb and main body are held above and out of contact with a table or support when placed thereon, substantially as described.

3. A clinical thermometer having the main body of the same at two longitudinally separated points provided with knobs or projections extending outwardly beyond any part of the bulb or main body portion, and two colored knobs or projections located in the transverse planes of the knobs first named, said colored knobs extending outwardly the same distance as the other knobs, substantially as described.

4. A thermometer of the class described, the bulb end of which is provided between the scale and said end and adjacent to said scale and at the bottom thereof with knobs or projections which raise said end of the scale of the thermometer when the latter is placed upon a table or other support, the top of said thermometer being also provided at said point with a colored knob or projection all of said knobs or projections extending outwardly beyond the line of the main body, substantially as described.

5. A clinical thermometer, the body portion of which is triangular in form in cross section, said body portion being provided at the opposite ends of the scale with a plurality of knobs or projections arranged at the corners thereof, and two of which at each end of the scale are placed at the bottom thereof and prevent the thermometer from rolling when placed upon a table or other support and raise the same above said table or support, the other two knobs being placed at the top of the body portion of the thermometer and serving to locate the scale to aid in the reading thereof, the knobs or projections extending outwardly beyond the main body, substantially as described.

In testimony that I claim the foregoing as my invention I have signed my name in presence of the subscribing witnesses this 7th day of August 1907.

CHARLES NURNBERG.

Witnesses:
C. E. MULREANY,
A. P. APPLEMAN.